US012703281B2

(12) United States Patent
Long

(10) Patent No.: US 12,703,281 B2
(45) Date of Patent: Aug. 11, 2026

(54) VEHICLE-MOUNTED DETACHABLE LUMBAR SUPPORT PILLOW STRUCTURE CAPABLE OF BEING ADJUSTED UPWARDS AND DOWNWARDS

(71) Applicant: Fang Long, Jishou (CN)

(72) Inventor: Fang Long, Jishou (CN)

( * ) Notice: Subject to any disclaimer, the term of this patent is extended or adjusted under 35 U.S.C. 154(b) by 161 days.

(21) Appl. No.: 18/750,736

(22) Filed: Jun. 21, 2024

(65) Prior Publication Data

US 2024/0343175 A1 Oct. 17, 2024

(51) Int. Cl.
*A47C 7/36* (2006.01)
*A47C 7/38* (2006.01)
*A47C 7/46* (2006.01)
*B60N 2/66* (2006.01)

(52) U.S. Cl.
CPC ............. *B60N 2/666* (2015.04); *B60N 2/663* (2015.04)

(58) Field of Classification Search
CPC .......... A47C 7/383; A47C 7/425; B60N 2/80; B60N 2/806
USPC .................... 297/216.12, 406, 408, 410, 391
See application file for complete search history.

(56) References Cited

U.S. PATENT DOCUMENTS 4,154,478 A * 5/1979 Cohune .................. A47C 7/383 297/410
5,112,106 A * 5/1992 Asbjornsen ............. A47C 7/46 297/284.7
5,967,613 A * 10/1999 McKeever ............... A61G 5/12 297/406
6,250,716 B1 * 6/2001 Clough .................. A47C 7/383 297/391
7,040,705 B2 * 5/2006 Clough .................. A47C 7/383 297/391
7,681,954 B2 * 3/2010 Barrou .................. B64D 11/06 297/408
RE44,432 E * 8/2013 Bartels .................. B60N 2/888 297/216.12
9,028,000 B2 * 5/2015 Millan ..................... B60N 2/24 297/391
10,315,773 B1 * 6/2019 Ahad ................. B64D 11/0638
10,829,019 B2 * 11/2020 Dexter ................... B60N 2/643
10,953,989 B1 * 3/2021 Mansouri ............... B60N 2/809
11,267,382 B2 * 3/2022 Clough .................. B60N 2/885
11,396,251 B2 * 7/2022 Clough .................. B60N 2/242
11,572,001 B1 * 2/2023 Kantner ................. B60N 2/809
11,864,661 B2 * 1/2024 Deevers ................. A47C 7/462
11,926,249 B2 * 3/2024 Wickham ............... B60N 2/868
11,950,708 B2 * 4/2024 Deng ....................... A47C 7/38
12,042,059 B2 * 7/2024 Sin ......................... A47C 7/383
12,428,159 B1 * 9/2025 Kuo ................... B64D 11/0641
12,514,373 B2 * 1/2026 Simmons ............... A47C 7/462
(Continued)

*Primary Examiner* — Shin H Kim

(57) ABSTRACT

Disclosed is a vehicle-mounted detachable lumbar support pillow structure capable of being adjusted upwards and downwards, including a car seat backrest, a sliding assembly, a connecting member and a car seat cushion, where the sliding assembly is embedded and mounted in the car seat backrest, the car seat cushion is mounted in front of the car seat backrest, and the connecting member is disposed between the sliding assembly and the car seat cushion; and one end of the connecting member is fixedly connected to the car seat cushion, and the other end of the connecting member is detachably connected to the sliding assembly.

6 Claims, 11 Drawing Sheets

(56) References Cited

U.S. PATENT DOCUMENTS

| | | | | |
|---|---|---|---|---|
| 12,515,570 | B2 * | 1/2026 | Schmidt | B60N 2/888 |
| 2002/0033628 | A1 * | 3/2002 | Clough | B60N 2/885<br>297/410 |
| 2004/0007910 | A1 * | 1/2004 | Skelly | B64D 11/06<br>297/284.3 |
| 2004/0195893 | A1 * | 10/2004 | Clough | A47C 7/38<br>297/391 |
| 2007/0108827 | A1 * | 5/2007 | Clough | B60N 2/885<br>297/391 |
| 2014/0339864 | A1 * | 11/2014 | Mizobata | B60N 2/888<br>297/216.12 |
| 2014/0368008 | A1 * | 12/2014 | Mizobata | B60N 2/427<br>297/216.12 |
| 2016/0023767 | A1 * | 1/2016 | Zheng | B60N 2/809<br>297/391 |
| 2017/0197529 | A1 * | 7/2017 | Hontz | B60N 2/885 |
| 2019/0328180 | A1 * | 10/2019 | Helgert | A47K 3/001 |
| 2020/0055483 | A1 * | 2/2020 | Rao | B60R 22/20 |
| 2021/0061473 | A1 * | 3/2021 | Mansouri | B60N 2/885 |
| 2023/0000255 | A1 * | 1/2023 | Sin | A47C 7/383 |

* cited by examiner

VEHICLE-MOUNTED DETACHABLE LUMBAR SUPPORT PILLOW STRUCTURE CAPABLE OF BEING ADJUSTED UPWARDS AND DOWNWARDS

TECHNICAL FIELD

The present disclosure relates to the field of mounting vehicle-mounted detachable lumbar support pillows, and more particularly relates to a vehicle-mounted detachable lumbar support pillow structure capable of being adjusted upwards and downwards.

BACKGROUND

During driving, a driver can choose a lumbar support pillow to protect his/her waist. The lumbar support pillow conforms to the curvature of a human waist, providing strong support and effectively relieving waist soreness and fatigue caused by long period of driving. Moreover, the lumbar support pillow has no pressure points on the human body and offers very good relief for lumbar spine pain, thereby creating a relaxed and comfortable driving environment for the driver. In addition, various attractive appearances of the car lumbar pillows are available to cater to preferences of different groups of people.

However, in actual use, the car lumbar pillows are usually purchased directly and placed on car seats, making them difficult to effectively fit and adjust them for individuals of different heights and weights, and the usability of the car lumbar pillows is weakened.

SUMMARY

In order to overcome the above defects in the prior art and solve the problems mentioned in the background, the present disclosure provides a vehicle-mounted detachable lumbar support pillow structure capable of being adjusted upwards and downwards.

In order to achieve the above objective, the present disclosure provides the following technical solution: a vehicle-mounted detachable lumbar support pillow structure capable of being adjusted upwards and downwards, including a car seat backrest, a sliding assembly, a connecting member and a car seat cushion, where the sliding assembly is embedded and mounted in the car seat backrest, the car seat cushion is mounted in front of the car seat backrest, and the connecting member is disposed between the sliding assembly and the car seat cushion;

- one end of the connecting member is fixedly connected to the car seat cushion, and the other end of the connecting member is detachably connected to the sliding assembly;
- the car seat cushion is slidably connected to the car seat backrest upwards and downwards through the sliding assembly; and
- the sliding assembly includes a casing and a matched decorative cover, a sliding groove with a certain length is vertically formed on the casing, serrations are formed on two opposite side walls of the sliding groove, and a length of the sliding groove is a stroke length of the car seat cushion that can be adjusted by sliding upwards and downwards.

As a further improvement for the technical solution of the present disclosure, the connecting member includes a docking stand and a fixed base, a turntable is disposed on one side of the docking stand, and the docking stand is rotationally connected to the fixed base through the turntable; and a plurality of sets of cambered groove are formed inside the fixed base and on an inner wall opposite to the turntable, spherical columns and second springs are embedded and mounted at positions in a horizontal direction of the docking stand corresponding to the cambered grooves, and the second springs are located behind the spherical columns; and when the spherical columns are snapped into the cambered grooves on the fixed base, a rotational position of the docking stand is locked.

As a further improvement for the technical solution of the present disclosure, the docking stand includes a first spring and a fastener disposed inside the docking stand, the fastener is located above the first spring, the fastener penetrates through a shell of the corresponding docking stand, a bottom shell is mounted below the first spring, and the fastener and the first spring form an elastic abutting state.

As a further improvement for the technical solution of the present disclosure, the sliding assembly further includes a base slidably disposed in the sliding groove, two opposite ends of the base are both provided with the movable toothed clamping blocks and third springs, the third springs are located behind the movable toothed clamping blocks, the movable toothed clamping blocks and the third springs are abutted against each other, and the movable toothed clamping blocks are meshed with the serrations.

As a further improvement for the technical solution of the present disclosure, a recess is formed on the base, and one end of the docking stand is inserted into the recess.

As a further improvement for the technical solution of the present disclosure, a snap-in hole is formed on the base, and the snap-in hole corresponds to the fastener on the docking stand; and when the fastener is snapped into the snap-in hole, the connecting member is in a fixed state.

As a further improvement for the technical solution of the present disclosure, a straight-line opening is formed on the decorative cover, the opening corresponds to the sliding groove, and the docking stand passes through the opening and is in butt joint with the base.

The present disclosure has the beneficial technical effects and advantages:

The present disclosure improves the previous designs, and utilizes a plurality of sets of connection methods to fix the car seat backrest, enabling the lumbar support pillow to be adjusted upwards and downwards, and rotated leftwards and rightwards to achieve the optimal angle capable of fitting the human back and improve the comfortableness.

Moreover, the car seat backrest can be disassembled and quickly mounted, facilitating subsequent cleaning, washing and replacement, making more convenient.

Figure 1:
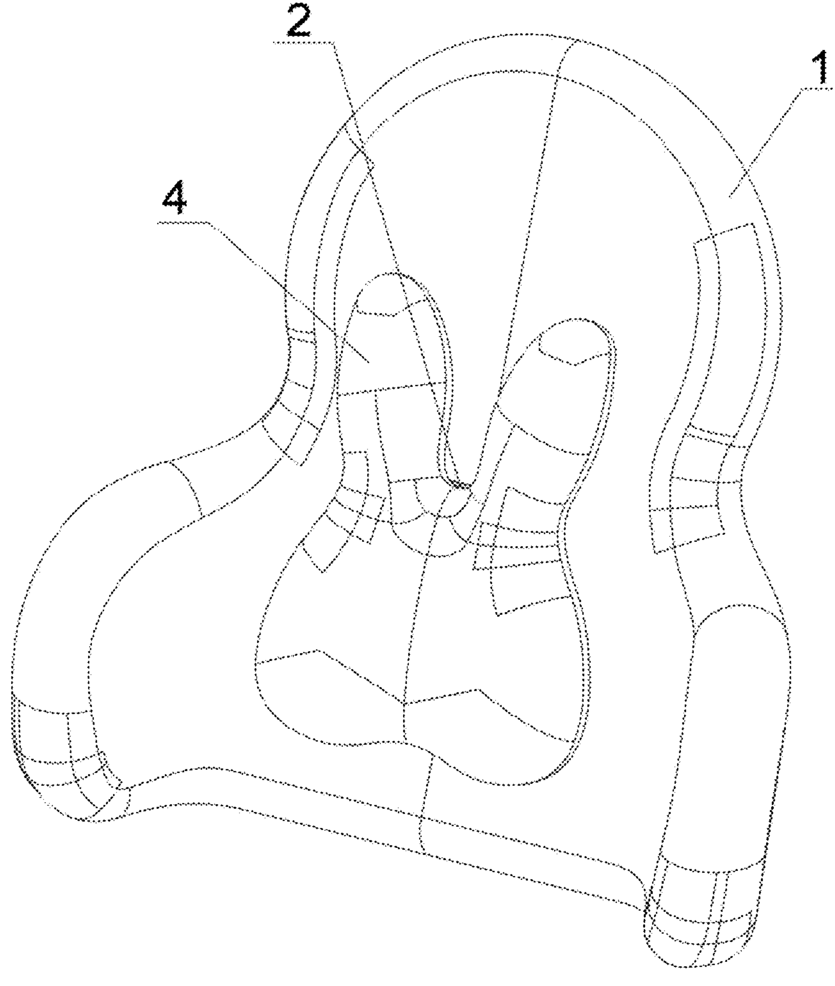
FIG. 1 is an overall structural schematic diagram of an embodiment according to the present disclosure.
Figure 2:
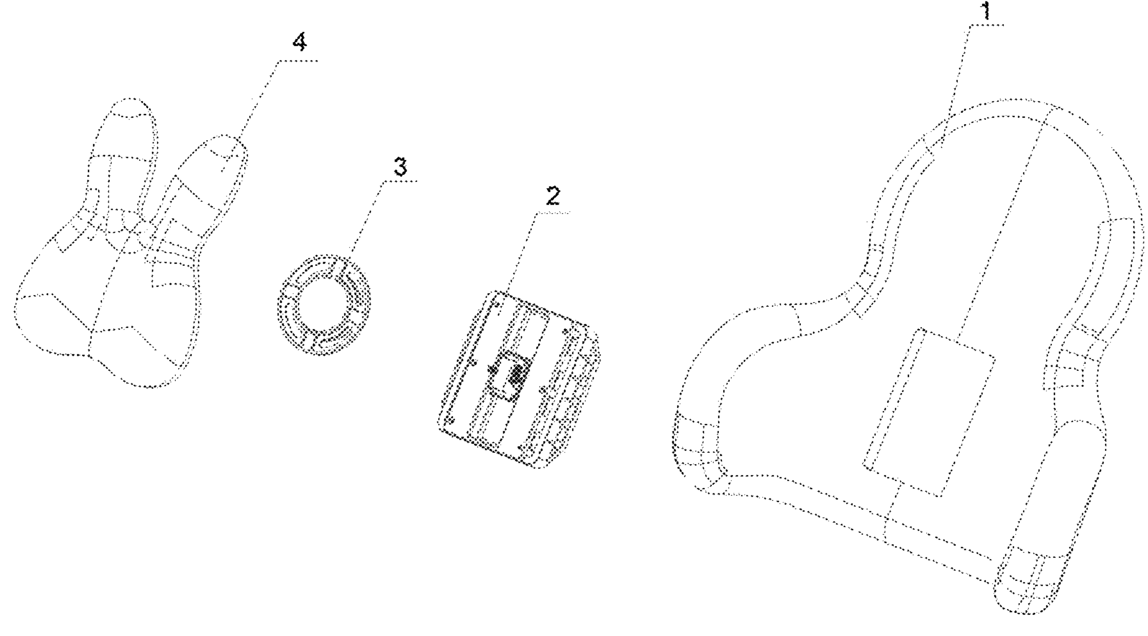
FIG. 2 is an exploded view of an embodiment according to the present disclosure.
Figure 3:
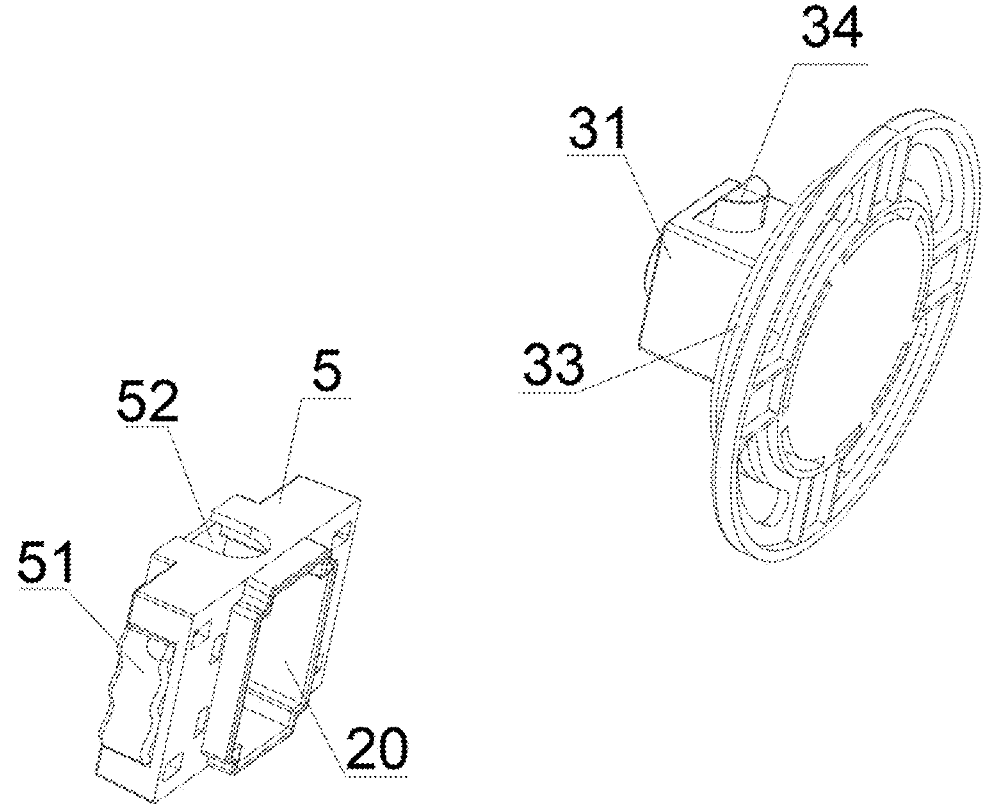
FIG. 3 is a structural schematic diagram of a connecting member and a base in an embodiment according to the present disclosure.
Figure 4:
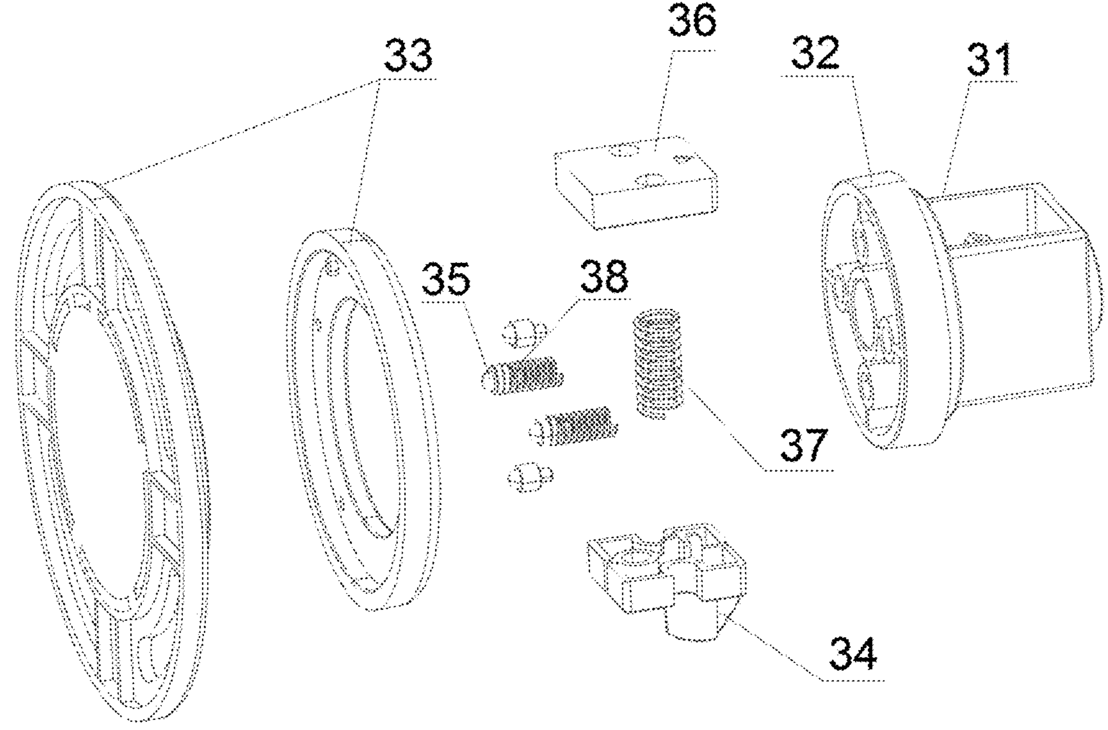
FIG. 4 is a structural schematic diagram of a connecting member in an embodiment according to the present disclosure.

Reference numerals in the accompanying drawings: 1. car seat backrest; 2. sliding assembly; 10. cambered groove; 20. recess; 21. casing; 22. decorative cover; 23. sliding groove; 24. serration; 3. connecting member; 30. opening; 31. docking stand; 32. turntable; 33. fixed base; 34. fastener; 35. spherical column; 36. bottom shell; 37. first spring; 38. second spring; 4. car scat cushion; 5. base; 51. movable toothed clamping block; 52. snap-in hole; and 53. third spring.

DETAILED DESCRIPTIONS OF THE EMBODIMENTS

The technical solutions in the embodiments of the present disclosure are described below clearly and comprehensively in conjunction with the accompanying drawings in the embodiments of the present disclosure. It is obvious that the embodiments described are merely a part of, not all of, embodiments of the present disclosure. All other embodiments obtained by those of ordinarily skilled in the art based on the embodiments of the present disclosure without making creative efforts fall within the scope of protection of the present disclosure.

As shown in FIGS. 1-12, a vehicle-mounted detachable lumbar support pillow structure capable of being adjusted upwards and downwards, including a car seat backrest 1, a sliding assembly 2, a connecting member 3 and a car seat cushion 4, where the sliding assembly 2 is embedded and mounted in the car seat backrest 1, the car seat cushion 4 is mounted in front of the car seat backrest 1, and the connecting member 3 is disposed between the sliding assembly 2 and the car seat cushion 4; one end of the connecting member 3 is fixedly connected to the car seat cushion 4, and the other end of the connecting member 3 is detachably connected to the sliding assembly 2; the car seat cushion 4 is slidably connected to the car seat backrest 1 upwards and downwards through the sliding assembly 2; and the sliding assembly 2 includes a casing 21 and a matched decorative cover 22, a sliding groove 23 with a certain length is vertically formed on the casing 21, serrations 24 are formed on two opposite side walls of the sliding groove 23, and a length of the sliding groove 23 is a stroke length of the car seat cushion 4 that can be adjusted by sliding upwards and downwards.

In some embodiments, as shown in FIGS. 4, 8, 11 and 12, the connecting member 3 includes a docking stand 31 and a fixed base 33, a turntable 32 is disposed on one side of the docking stand 31, the fixed base 33 includes a front shell and a rear shell, an accommodating cavity is formed between the front shell and the rear shell, the turntable 32 is located inside the accommodating cavity, and the docking stand 31 is rotationally connected to the fixed base 33 through the turntable 32; a plurality of sets of cambered groove 10 are formed inside the fixed base 33 and on an inner wall opposite to the turntable 32; and in this embodiment, the sets of cambered groove 10 are formed on an inner wall of the front shell, spherical columns 35 and second springs 38 are embedded and mounted at positions in a horizontal direction of the docking stand 31 corresponding to the cambered grooves 10, and the second springs 38 are located behind the spherical columns 35; and when the spherical columns 35 are snapped into the cambered grooves 10 on the fixed base 33, a rotational position of the docking stand 31 is locked, and the car seat cushion 4 is subjected to some damping force when it is rotated by setting the spherical columns by introducing the spherical columns 35 and the second springs 38.

Figure 5:
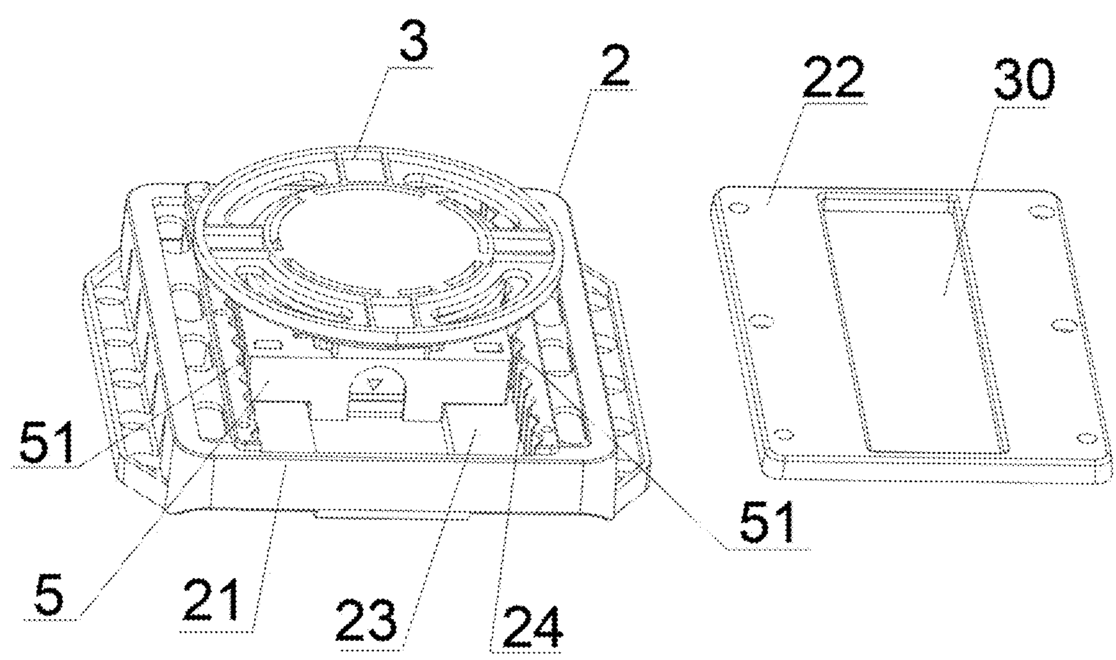
FIG. 5 is a structural schematic diagram of a sliding assembly in an embodiment according to the present disclosure.
Figure 6:
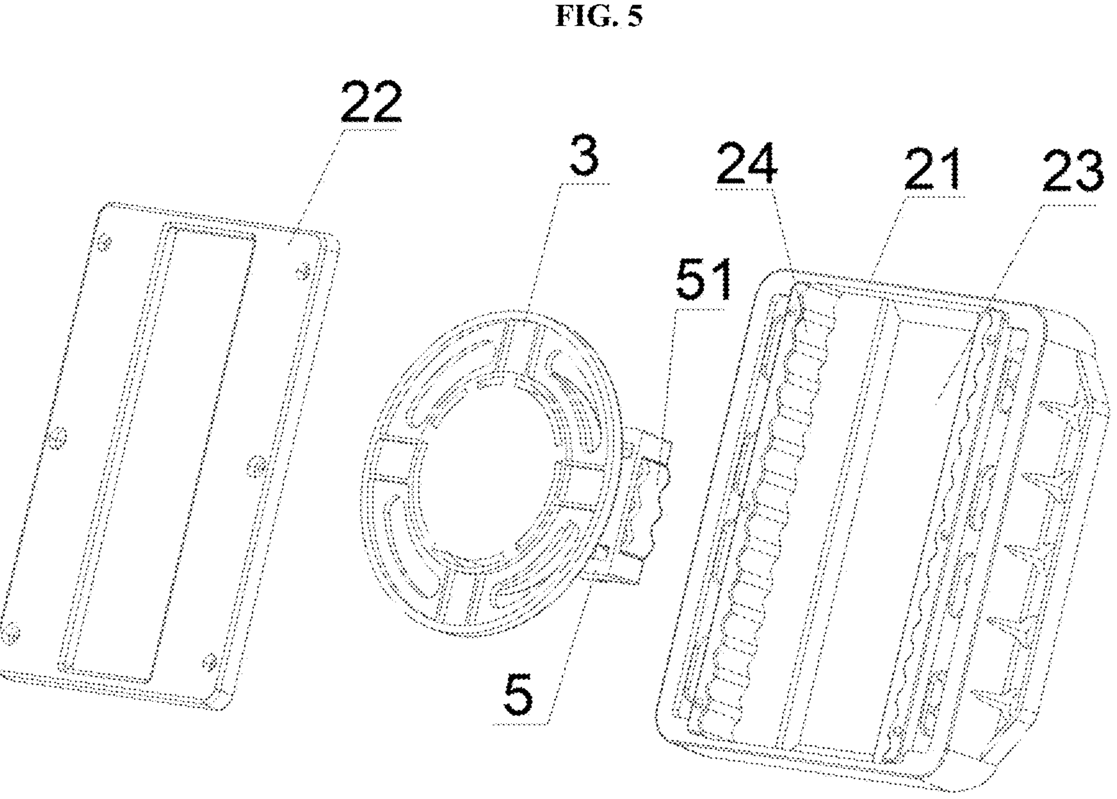
FIG. 6 is a structural schematic diagram of a sliding assembly and a connecting member in an embodiment according to the present disclosure.
Figure 7:
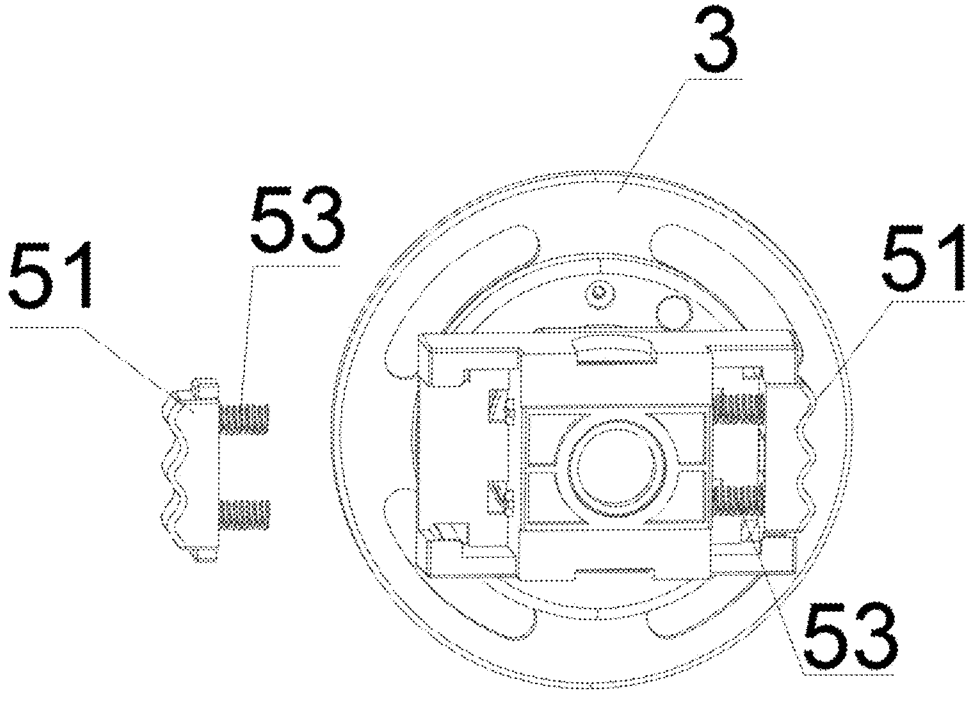
FIG. 7 is a structural schematic diagram of a base in an embodiment according to the present disclosure.
Figure 11:
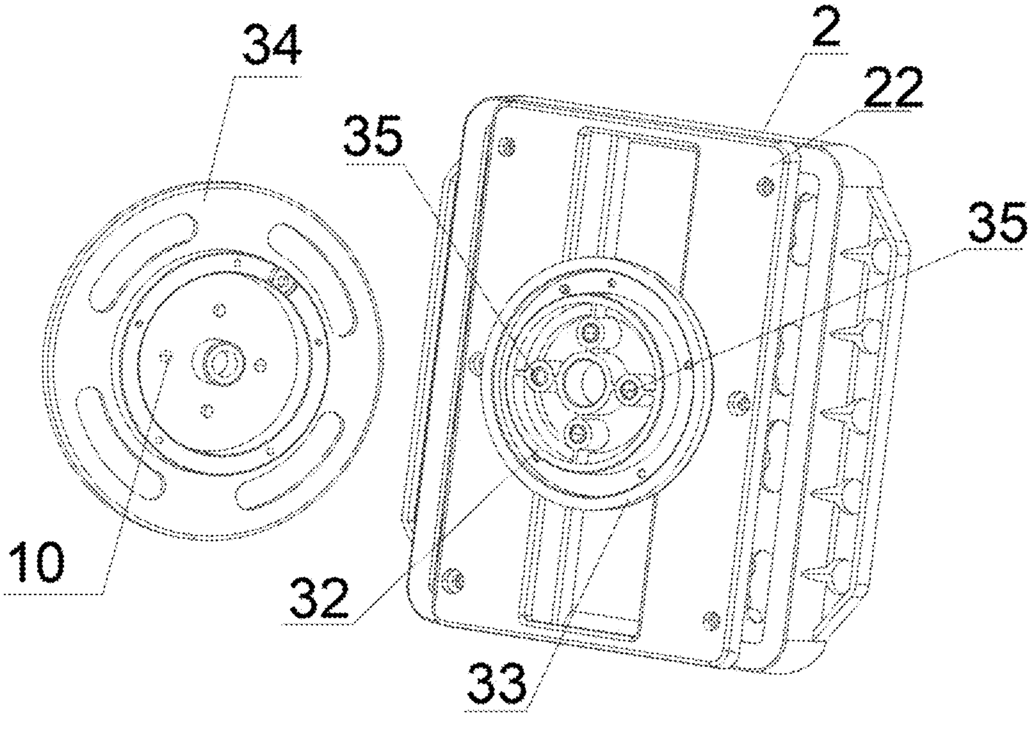
FIG. 11 is a schematic diagram of an internal structure of a fixed base in an embodiment according to the present disclosure.
Figure 12:
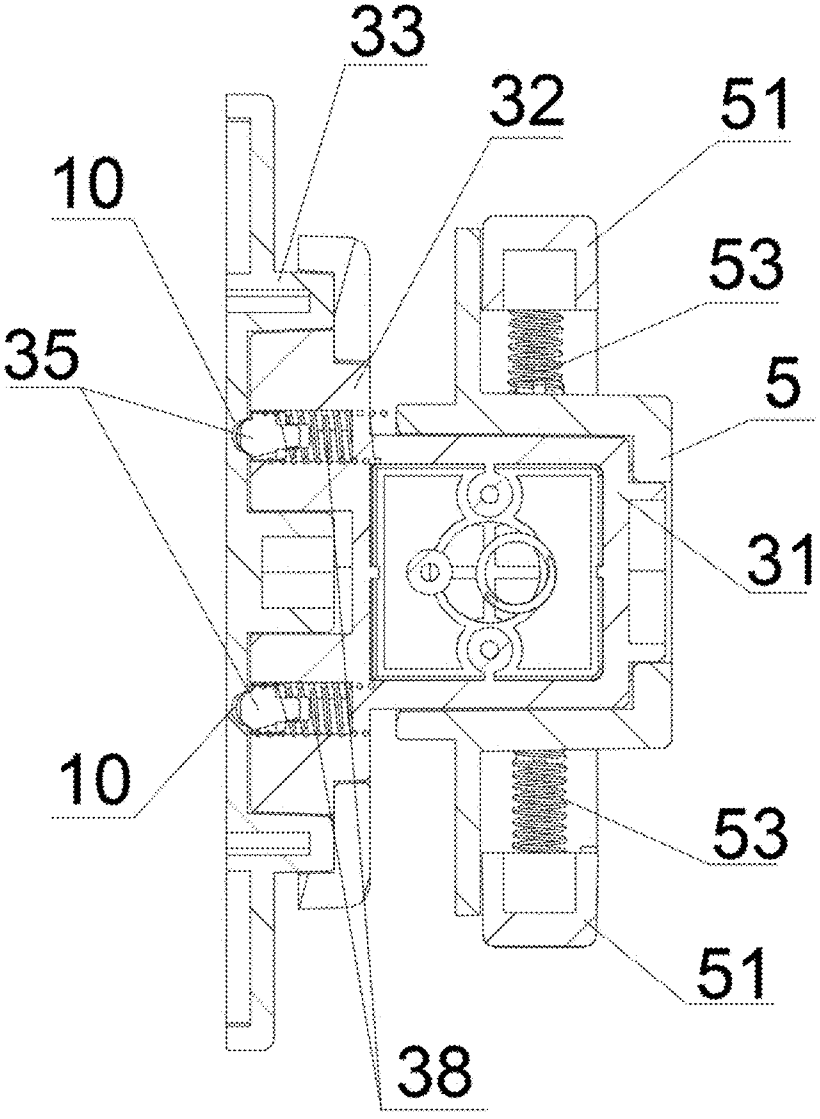
FIG. 12 is a sectional view of an overall structure of a connecting member and a base in an embodiment according to the present disclosure.

In this way, as shown in FIGS. 5, 6 and 11, the serrations 24 extend from a bottom of the sliding groove 23 to a position close to a top of the sliding groove 23, where a height of the sliding groove 23 is greater than a height of movable toothed clamping blocks 51, such that a height of the car seat cushion 4 can be adjusted through upward and downward sliding of a base 5; and the fixed base 33 is fixed on the car seat cushion 4 through bolts or buckles, when the car seat cushion 4 is rotated, the fixed base 33 is rotated together with the car seat cushion 4, and when the fixed base is rotated to the spherical columns 35 and snapped into the cambered grooves 10 on the fixed base, a position of the car seat cushion 4 is locked.

Figure 8:
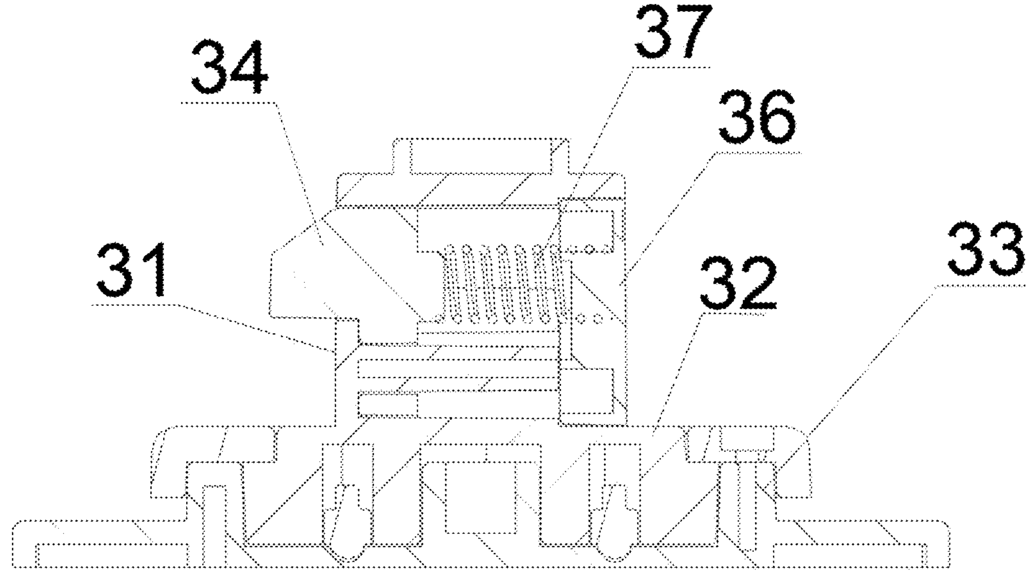
FIG. 8 is a sectional view of a connecting member in an embodiment according to the present disclosure.
Figure 9:
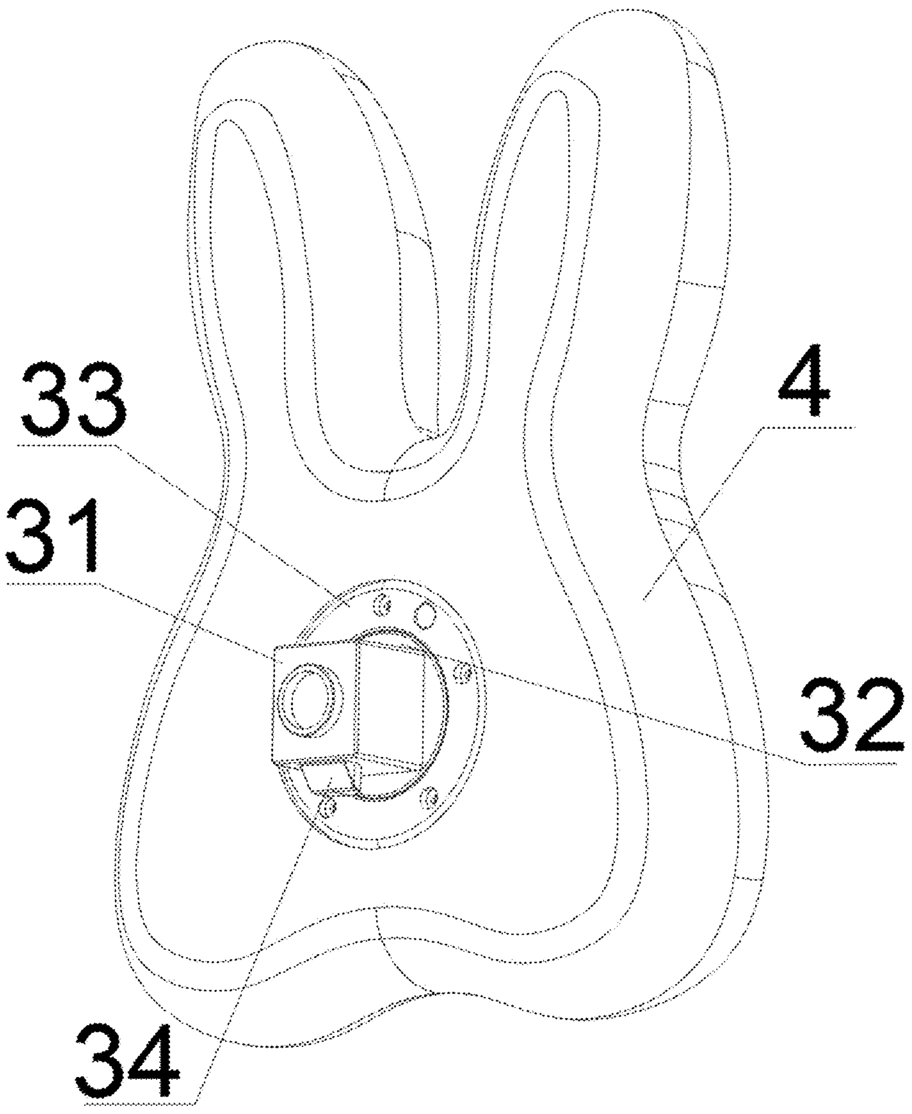
FIG. 9 is a structural schematic diagram of a car seat cushion and a connecting member in an embodiment according to the present disclosure.
Figure 10:
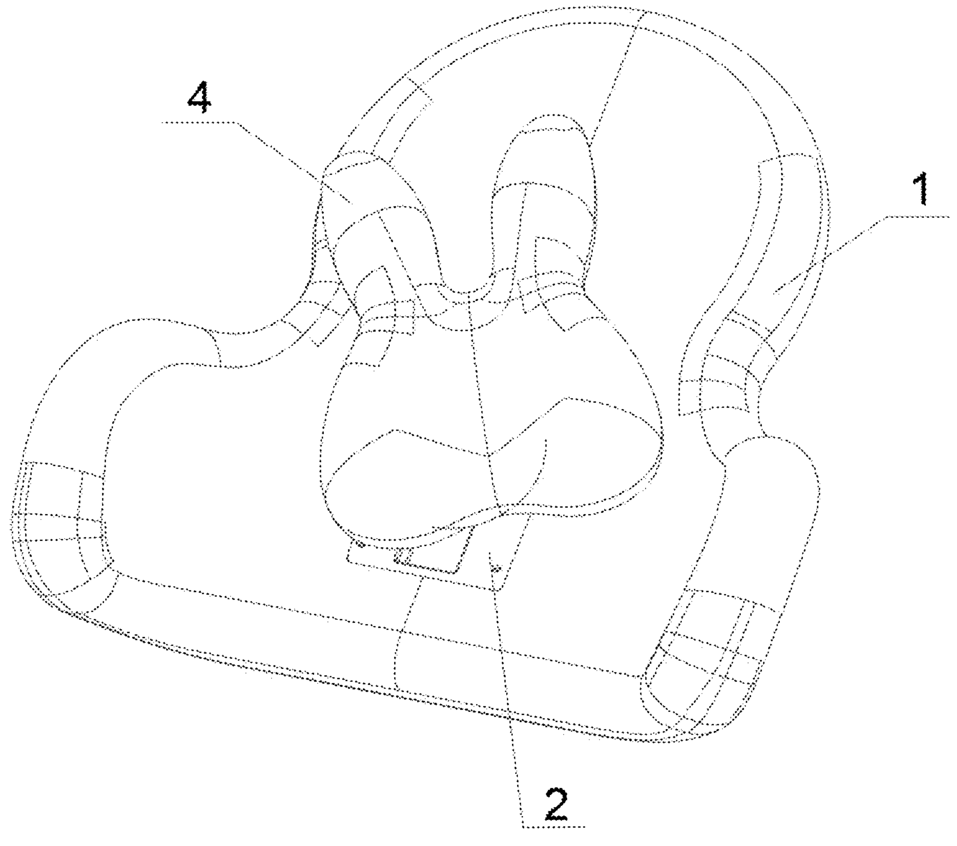
FIG. 10 is a schematic diagram of a rotation state of a car seat cushion in an embodiment according to the present disclosure.

In some embodiments, as shown in FIG. 8, the docking stand 31 includes a first spring 37 and a fastener 34 disposed inside the docking stand 31, the fastener 34 is located above the first spring 37, the fastener 34 penetrates through a shell of the corresponding docking stand 31, a bottom shell 36 is mounted below the first spring 37, and the fastener 34 and the first spring 37 form an elastic abutting state.

In some embodiments, as shown in FIGS. 1-12, the sliding assembly 2 further includes the base 5 slidably disposed in the sliding groove 23, two opposite ends of the base 5 are both provided with the movable toothed clamping blocks 51 and third springs 53, the third springs 53 are located behind the movable toothed clamping blocks 51, the movable toothed clamping blocks 51 and the third springs 53 are abutted against each other, mounting grooves are transversely formed on left and right sides of the base 5, and the movable toothed clamping blocks 51 and the third springs 53 are mounted in the mounting grooves in a one-to-one correspondence manner, the movable toothed clamping blocks 51 are meshed with the serrations 24; the arrangement of the movable toothed clamping blocks 51, the serrations 24 and the third springs 53 makes the base 5 subjected to some damping force when the base 5 slides upwards and downwards, thereby preventing the car seat cushion 4 from sliding randomly; and a recess 20 is formed on the base 5, one end of the docking stand 31 is inserted into the recess 20, a snap-in hole 52 is formed on the base 5, and the snap-in hole 52 corresponds to the fastener 34 on the docking stand 31; and when the fastener 34 is snapped into the snap-in hole 52, the connecting member 3 is in a fixed state;

in such a way, when a user can press the fastener 34, the third springs 53 are compressed and deformed, and the fastener 34 can be detached from the snap-in hole 52, such that the car seat cushion 4 can be removed, making it very convenient to use; and to mount the car seat cushion, the user only needs to insert one end thereof corresponding to the connecting member 3 into the recess 20 on the base 5 until the fastener 34 is snapped-into the snap-in hole 52 to complete the mounting of the car seat cushion 4.

Specifically, a straight-line opening 30 is formed on the decorative cover 22, the opening 30 corresponds to the sliding groove 23, the docking stand 31 passes through the opening 30 and is in butt joint with the base 5, the base 5 is disposed behind the decorative cover 22, and the arrangement of the decorative cover 22 can prevent the base 5 from falling off; and in this embodiment, the decorative cover 22 can be fixed on the casing 21 through screws, where a length of the opening 30 matches a length of the sliding groove 23.

A working principle of the present disclosure:

The present disclosure mainly provides a vehicle-mounted lumbar support pillow mounting structure, the car seat cushion 4 is fixed on the fixed base 33, the docking stand 31, the turntable 32, the fixed base 33, the fastener 34, the cambered grooves 10, the spherical columns 35, the bottom shell 36, the first spring 37, the second springs 38 and other structures are assembled into the connecting member 3, the fastener 34 is pressed to squeeze the first spring 37, and the fastener 34 is detached from the snap-in hole 52 on the base 5, such that disassembly of the car seat cushion 4 is rapidly completed, and rotation of the car seat cushion 4 is subjected to some damping force; when the spherical columns 35 are snapped into the cambered grooves 10, a rotational position of the car seat cushion 4 is locked; it is only necessary to move the car seat cushion 4 upwards and downwards to adjust a height of the car seat cushion 4, such that an upper teeth of the movable toothed clamping blocks 51 are snapped-into the serrations 24 on the casing 21 to complete limit locking, and a direction of the car seat cushion 4 is rotated or a height of the car seat cushion 4 is adjusted upwards or downwards to make the car seat cushion better fit a human back and improve the comfortableness.

Then, in the accompanying drawings of the embodiments disclosed in the present disclosure, only the structures related to the disclosed embodiments are provided, and other structures can refer to the usual design. Under the condition of having no conflict, the same embodiments and different embodiments of the present disclosure can be combined with one another.

Finally, what is described above is merely preferred embodiments of the present disclosure. Any modifications, equivalent replacements and improvements, etc. made within the spirit and principle of the present disclosure should fall within the scope of protection of the present disclosure.

What it claimed is:

1. A vehicle-mounted detachable lumbar support pillow structure capable of being adjusted upwards and downwards, comprising: a car seat backrest, a sliding assembly, a connecting member and a car seat cushion, wherein the sliding assembly is embedded and mounted in the car seat backrest, the car seat cushion is mounted in front of the car seat backrest, and the connecting member is disposed between the sliding assembly and the car seat cushion;

one end of the connecting member is fixedly connected to the car seat cushion, and the other end of the connecting member is detachably connected to the sliding assembly;

the car seat cushion is slidably connected to the car seat backrest upwards and downwards through the sliding assembly; and the sliding assembly comprises a casing and a matched decorative cover, a sliding groove with a certain length is vertically formed on the casing, serrations are formed on two opposite side walls of the sliding groove, and a length of the sliding groove is a stroke length of the car seat cushion that can be adjusted by sliding upwards and downwards;

wherein the connecting member comprises a docking stand and a fixed base, a turntable is disposed on one side of the docking stand, and the docking stand is rotationally connected to the fixed base through the turntable; and a plurality of sets of cambered grooves are formed inside the fixed base and on an inner wall opposite to the turntable, spherical columns and second springs are embedded and mounted at positions in a horizontal direction of the docking stand corresponding to the cambered grooves, and the second springs are located behind the spherical columns; and when the spherical columns are snapped into the cambered grooves on the fixed base, a rotational position of the docking stand is locked.

2. The vehicle-mounted detachable lumbar support pillow structure capable of being adjusted upwards and downwards according to claim 1, wherein the docking stand comprises a first spring and a fastener disposed inside the docking stand, the fastener is located above the first spring, the fastener penetrates through a shell of the corresponding docking stand, a bottom shell is mounted below the first spring, and the fastener and the first spring form an elastic abutting state.

3. The vehicle-mounted detachable lumbar support pillow structure capable of being adjusted upwards and downwards according to claim 1, wherein the sliding assembly further comprises a base slidably disposed in the sliding groove, two opposite ends of the base are both provided with movable toothed clamping blocks and third springs, the third springs are located behind the movable toothed clamping blocks, the movable toothed clamping blocks and the third springs are abutted against each other, and the movable toothed clamping blocks are meshed with the serrations.

4. The vehicle-mounted detachable lumbar support pillow structure capable of being adjusted upwards and downwards according to claim 3, wherein a recess is formed on the base, and one end of the docking stand is inserted into the recess.

5. The vehicle-mounted detachable lumbar support pillow structure capable of being adjusted upwards and downwards according to claim 3, wherein a snap-in hole is formed on the base, and the snap-in hole corresponds to the fastener on the docking stand; and when the fastener is snapped into the snap-in hole, the connecting member is in a fixed state.

6. The vehicle-mounted detachable lumbar support pillow structure capable of being adjusted upwards and downwards according to claim 1, wherein a straight-line opening is formed on the decorative cover, and the opening corresponds to the sliding groove.

* * * * *